United States Patent [19]

Takahashi et al.

[11] Patent Number: 5,301,062

[45] Date of Patent: Apr. 5, 1994

[54] DISPLAY HAVING DIFFRACTION GRATING PATTERN

[75] Inventors: Susumu Takahashi, Matsudo; Toshiki Toda, Satte; Fujio Iwata, Chiba, all of Japan

[73] Assignee: Toppan Printing Co., Ltd., Tokyo, Japan

[21] Appl. No.: 826,869

[22] Filed: Jan. 28, 1992

[30] Foreign Application Priority Data

Jan. 29, 1991 [JP] Japan .............................. 3-026684
Apr. 11, 1991 [JP] Japan .............................. 3-079080

[51] Int. Cl.⁵ .............................................. G02B 5/18
[52] U.S. Cl. .................................. 359/567; 359/569
[58] Field of Search ............... 359/22, 23, 24, 567, 359/569, 566

[56] References Cited

U.S. PATENT DOCUMENTS

| | | | |
|---|---|---|---|
| 4,455,061 | 6/1984 | Case | 359/22 |
| 4,547,037 | 10/1985 | Case | 359/22 |
| 4,778,262 | 10/1988 | Haines | 359/9 |
| 5,032,003 | 7/1991 | Antes | 359/569 |
| 5,066,100 | 11/1991 | Ferrante | 359/569 |
| 5,132,812 | 7/1992 | Takahashi et al. | 359/569 |

FOREIGN PATENT DOCUMENTS

| | | |
|---|---|---|
| 19576/83 | 4/1984 | Australia. |
| 74804/87 | 12/1987 | Australia. |
| 53729/90 | 10/1991 | Australia. |
| 0357837 | 3/1990 | European Pat. Off.. |
| 0423680 | 4/1991 | European Pat. Off.. |
| 0467601 | 1/1992 | European Pat. Off.. |
| WO90/07133 | 6/1990 | PCT Int'l Appl.. |
| WO91/03747 | 3/1991 | PCT Int'l Appl.. |

*Primary Examiner*—Bruce Y. Arnold
*Assistant Examiner*—Darryl Collins
*Attorney, Agent, or Firm*—Armstrong, Westerman, Hattori, McLeland & Naughton

[57] ABSTRACT

A display having a diffraction grating pattern includes:
(a) a flat substrate; and
(b) at least one dot formed on a surface of the flat substrate, the dot being formed by a diffraction grating pattern as an aggregate of a plurality of curves obtained by translating a curve.

12 Claims, 12 Drawing Sheets

DISPLAY HAVING DIFFRACTION GRATING PATTERN

BACKGROUND OF THE INVENTION

1. Field of the Invention

The present invention relates to a display in which small diffraction gratings are arranged in units of dots on a surface of a flat substrate and, more particularly, to an inexpensive display having diffraction grating patterns which can be easily manufactured and can express a stereoscopic (three-dimensional) image having no image omissions.

2. Description of the Related Art

A display having a diffraction grating pattern by arranging a plurality of small dots each consisting of a diffraction grating on a surface of a flat substrate has been frequently used. A method disclosed in, e.g., Published Unexamined Japanese Patent Application No. 60-156004 is used as a method of manufacturing a display having a diffraction grating pattern of this type. According to this method, small interference fringes (to be referred to as diffraction gratings hereinafter) obtained by two-beam interference are changed in pitch, direction, and light intensity, and the resultant images are sequentially exposed on a photosensitive film.

In recent years, the present inventor has proposed a method of manufacturing a display having a diffraction grating pattern of a given graphic image in such a manner that an X-Y stage on which a flat substrate is placed is moved under the control of a computer using, e.g., an electron beam exposure apparatus, and a plurality of small dots consisting of diffraction gratings are arranged on the surface of the flat substrate. This method is disclosed in U.S. Pat. No. 5,058,992.

In a display manufactured by this method, however, an image input from an image scanner or the like or a two-dimensional image formed by computer graphics is used as an image for the display having the diffraction grating patterns. For this reason, a graphic image expressed by the diffraction grating pattern are located on the surface of the flat substrate on which the diffraction gratings are arranged, so that only a flat (two-dimensional) graphic image can be expressed. As a result, a stereoscopic (three-dimensional) image cannot be expressed, resulting in inconvenience.

SUMMARY OF THE INVENTION

It is the first object of the present invention to provide a display having diffraction grating patterns capable of expressing a stereoscopic (three-dimensional) image without any image omissions.

It is the second object of the present invention to provide an inexpensive display having diffraction grating patterns which can be easily manufactured.

In order to achieve the above objects of the present invention, there is provided a display having a diffraction grating pattern, comprising:

(a) a flat substrate; and
(b) at least one dot formed on a surface of the flat substrate, the dot being formed by a diffraction grating pattern as an aggregate of a plurality of curves obtained by translating a curve.

In particular, the dot is constituted by an aggregate of a plurality of curves obtained by translating a curve at a predetermined pitch.

Changes in gradient $\Omega$ where $\Omega$ changes from $\Omega_1$ to $\Omega_2$ when a pitch d is used are preferably defined as follows:

$$\tan(\Omega_1) = \sin(\alpha_1)/\sin(\theta)$$

$$\tan(\Omega_2) = \sin(\alpha_2)/\sin(\theta)$$

$$d = \lambda/\sin(\theta)$$

where $\theta$ is the incident angle of illumination light, $\alpha_1$ and $\alpha_2$ are angles (directions of first-order diffracted light) from which the diffraction gratings are observed, and $\lambda$ is the wavelength of the first-order diffracted light.

The dot is constituted by an aggregate of a plurality of curves obtained by translating a curve upon arbitrary changes in pitch of the curves.

If wavelengths of diffracted light components are defined as $\lambda_1, \lambda_2, \ldots, \lambda_m, \ldots, \lambda_n$, and intensities of the light components at the respective wavelengths are defined as $A_1, A_2, \ldots, A_m, \ldots, A_n$, spatial frequencies (reciprocals of the pitches) of the diffraction gratings required to diffract the light components having the respective wavelengths are defined as follows:

$$f_1 = \sin(\theta)/\lambda_1$$

$$f_2 = \sin(\theta)/\lambda_2$$

$$f_m = \sin(\theta)/\lambda_m$$

$$f_n = \sin(\theta)/\lambda_n$$

A delta function is defined as $\delta(x)$, a spatial frequency distribution of $F(fx)$ represented by the following equation is given to the diffraction gratings, and a function obtained by transforming $F(fx)$ in accordance with an inverse Fourier transform is defined as $f(x)$, and the curve is translated to have an $f(x)$ distribution in the translation direction:

$$F(fx) = \sum_{m=1}^{n} A_m \cdot \delta \cdot (fx - fm)$$

On the other hand, the dot has a region in which no diffraction grating is present. This region in which no diffraction grating is present is divided by parallel curves in the translation direction of the curve.

In a display having diffraction grating patterns according to the present invention, when the display is observed, a flat image to be displayed upon observation from the right direction can be observed from the right direction. A flat image to be displayed upon observation from the front can be observed from the front direction, and a flat image to be displayed upon observation from the left direction is observed from the left direction. For this reason, an observer can observe images having parallaxes in the left, front, and right directions, thereby observing a stereoscopic (three-dimensional) image.

Since diffraction gratings are formed in the form of dots, no diffraction grating is formed at a position where no data is present. For this reason, unnecessary diffraction gratings need not be formed, and noise can be much reduced as compared with a hologram.

In addition, an ideal diffraction grating can be digitally formed, so that a bright image can be reproduced as compared with a conventional hologram.

Since the diffraction gratings are constituted by an aggregate of curves obtained by translating a curve with arbitrary changes in pitch of diffracted light components in units of dots, colors of the diffracted light components in units of dots are not limited to colors of single wavelengths but can be set to be arbitrary colors. For this reason, the observer can observe a more natural stereoscopic image.

In order to achieve the above objects of the present invention, there is also provided a display having a diffraction grating pattern having another arrangement. That is, there is provided a display having a diffraction grating pattern, comprising:

(a) a flat substrate;
(b) at least one dot formed on a surface of the flat substrate, the dot being formed by a diffraction grating pattern as an aggregate of a plurality of curves obtained by translating a curve; and
(c) light-shielding means having a predetermined shape and arranged on an illumination light incident side of the diffraction gratings, or light-shielding means having a predetermined pattern and arranged on a diffracted light emerging side of the diffraction gratings.

The light-shielding means is formed by a printing ink or by using a spatial modulation element.

In the display having the diffraction pattern having the above arrangement according to the present invention, since the light-shielding means is arranged on the illumination light incident side of the diffraction gratings, a portion irradiated with the illumination light and a portion not irradiated with the illumination light are formed on the display. Alternatively, a portion through which diffracted light is transmitted and a portion through which diffracted light is not transmitted are formed on the display on the diffracted light emerging side of the diffraction gratings. Therefore, when the observer observes the display, he observes images having parallaxes in the left, front, and right directions, thereby observing a stereoscopic (three-dimensional) image.

Even if the number of types of diffraction gratings is one, the shielding means is interchanged with one another to change the shape, thereby freely expressing the shapes of the stereoscopic (three-dimensional) images.

In addition, even if a graphic image is changed, the diffraction grating is constant independently of the graphic image. The diffraction grating need not be formed by an electron beam drawing apparatus every time the shape of the graphic image is changed. For this reason, efficiency can be greatly improved in terms of time and cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A display having diffraction grating patterns according to the present invention will be described with reference to FIGS. 1 to 10. The display is formed by using an electron beam in this embodiment.

Figure 1:
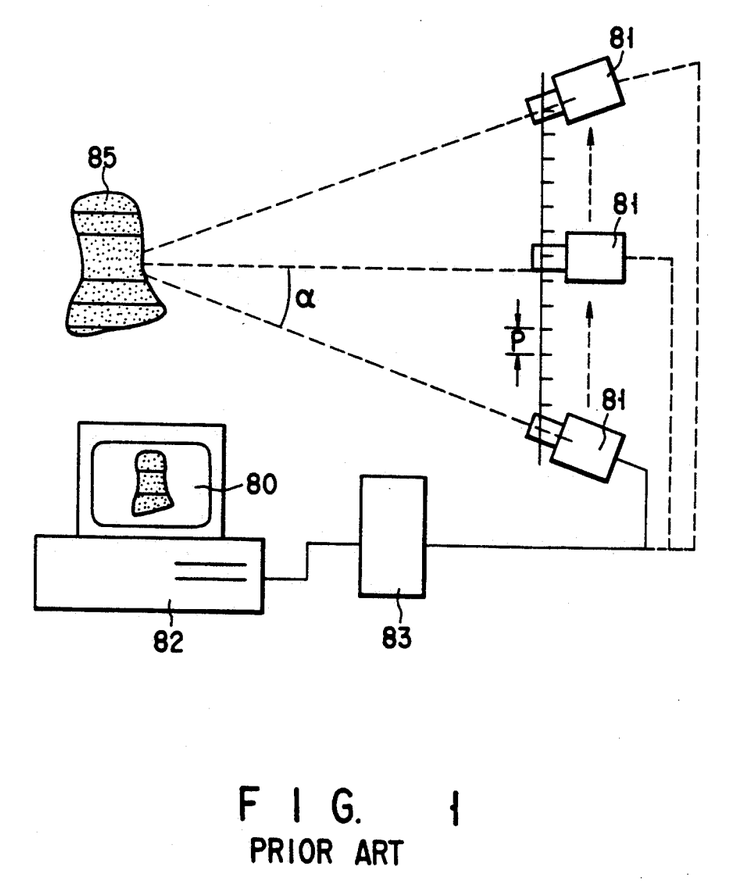
FIG. 1 is a view for explaining a method of photographing an original image according to the present invention.

A method of inputting a plurality of flat images will be described with reference to FIG. 1. A flat image 80 of an object 85 to be stereoscopically displayed is photographed using a television camera 81. One television camera 81 is located at each of a plurality of positions defined at an interval p and photographs the plurality of flat images 80 of the object 85 at the respective positions. These data of the flat images 85 are input to a computer 82 through a digitizer 83 and are stored as image data. In order to input the data of the flat images 85 to the computer 82, data recorded on a video tape may be used, or data of a photograph or movie may be used. The object 85 to be stereoscopically displayed is not limited to an existing object, but may be a computer graphic object.

A method of determining a direction $\Omega$ and a pitch d of a diffraction grating will be described with reference to FIGS. 2 and 3.

Figure 2:
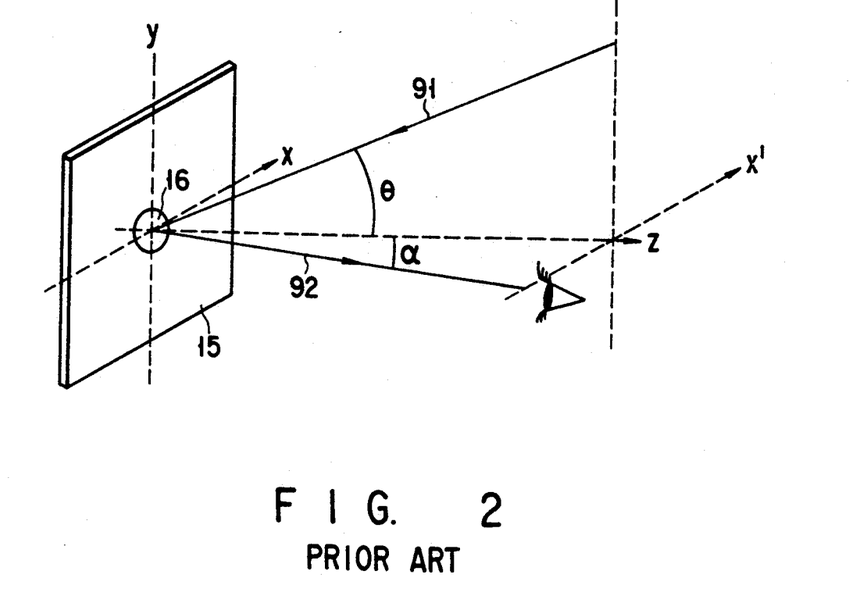
FIG. 2 is a view for explaining a method of observing a dot formed according to the present invention.
Figure 3:
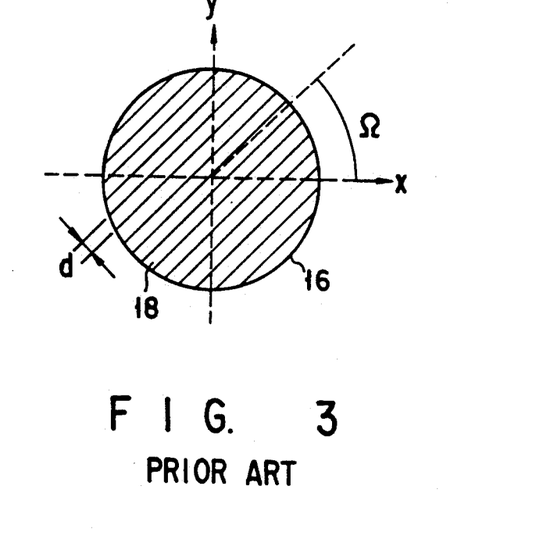
FIG. 3 is an enlarged view of the dot according to the present invention.

As shown in FIG. 2, assume that an observer observes a display 15 having a dot 16. As shown in FIG. 2, an incident angle of illumination light 91 is defined as $\theta$, a direction of first-order diffracted light 92 diffracted by a diffraction grating 18 is defined as $\alpha$, and a wavelength of the first-order diffracted light 92 is defined as $\lambda$. As shown in FIG. 3, the direction $\Omega$ and the pitch d (i.e., a reciprocal of a spatial frequency) of the diffraction grating 18 can be obtained by the following equations. Note that the illumination light 91 passes through the Y-Z plane, and diffracted light passes through the X-Z plane:

$$\tan(\Omega) = \sin(\alpha)/\sin(\theta)$$

$$d = \lambda/\{\sin^2(\theta) + \sin^2(\alpha)\}^{\frac{1}{2}}$$

By using the above equations, the direction $\Omega$ and the pitch d of the diffraction grating can be obtained to diffract the illumination light 91 in an arbitrary direction. That is, by giving the incident angle $\theta$ of the illumination light 91, the direction $\alpha$ of the first-order diffracted light 92, and the wavelength $\lambda$ of the first-order diffracted light 92, the direction $\Omega$ and the pitch d of the diffraction grating 18 can be obtained.

A pitch d' of a diffraction grating for diffracting incident light to the front direction ($\alpha=0$) is obtained as follows:

$$d' = \lambda/\sin(\theta)$$

therefore, $$d = d' \cdot \sin(\theta)/\{\sin^2(\theta) + \sin^2(\alpha)\}^{\frac{1}{2}}$$
$$= d' \cdot \cos(\Omega)$$

Figure 4:
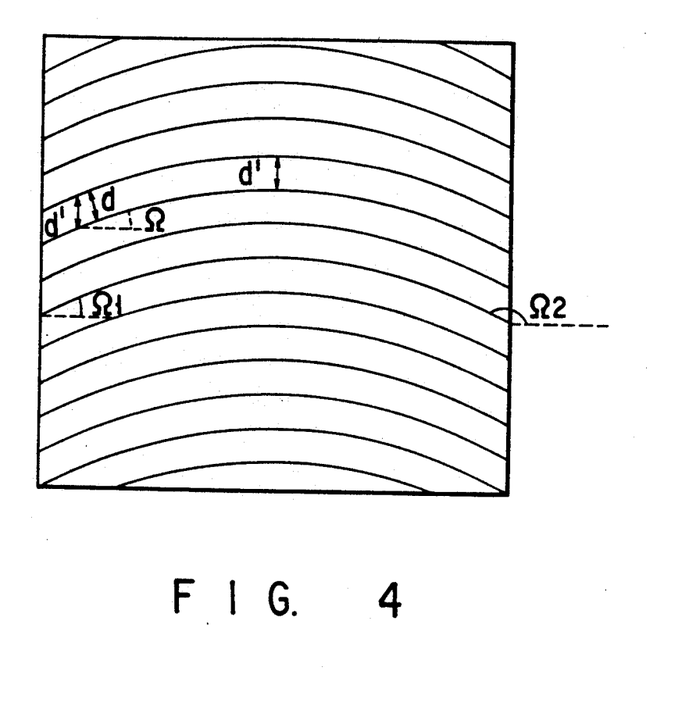
FIG. 4 is an enlarged view of a basic dot of a diffraction grating image according to the present invention.

As shown in FIG. 4, in an arrangement in which a curve is translated at a predetermined pitch, the above equation is always satisfied. For this reason, the diffraction grating is so constructed that the observer can always observe the diffracted light having a wavelength of the same color even if viewpoints are moved in the horizontal direction. In the dot shown in FIG. 4, the gradients of the curves constituting the dot are changed from $\Omega_1$ to $\Omega_2$, and the resultant curves are aligned at the pitch d'. That is, in order to obtain a grating dot such that the diffraction range in the horizontal direction covers a region ranging from an angle $\alpha_1$ to $\alpha_2$ with respect to the normal to the surface on which the grating is present, the following equations are established:

$$\tan(\Omega_1) = \sin(\alpha_1)/\sin(\theta)$$

$$\tan(\Omega_2) = \sin(\alpha_2)/\sin(\theta)$$

$$d = \lambda/\sin(\theta)$$

Therefore, a grating obtained by translating a curve having a gradient $\Omega$ which changes from $\Omega_1$ to $\Omega_2$ when the pitch d' is used.

A basic dot of the diffraction image according to the present invention has an arrangement shown in FIG. 4.

Figure 5:
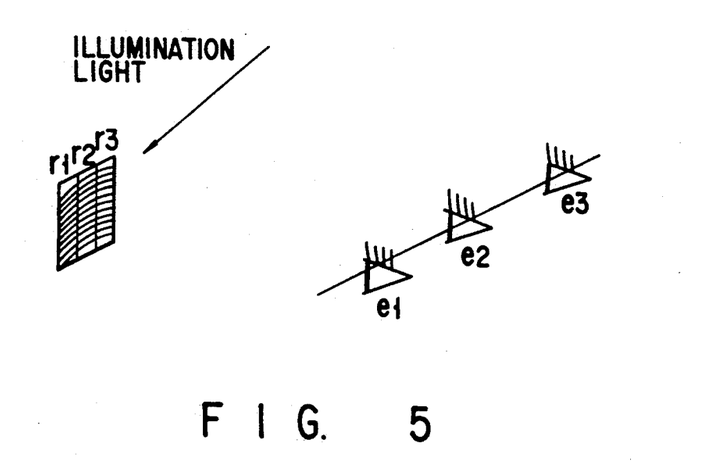
FIG. 5 is a view for explaining a method of dividing one dot according to the present invention.

This dot is divided into three regions in the vertical direction, as shown in FIG. 5. These three regions are defined as $r_1$, $r_2$, and $r_3$ from the left. Light incident on the region $r_1$ is diffracted in the left direction, light incident on the region $r_2$ is diffracted in the front direction, and light incident on the region $r_3$ is diffracted in the right direction.

In order to observe this dot from only the left direction, a diffraction grating portion for only the region $r_1$ is drawn, and no patterns are drawn for the regions $r_2$ and $r_3$. In this case, the observer can observe this dot bright only when the viewpoint falls within a range $e_1$. In the arrangement of FIG. 5, the dot of the diffraction grating is vertically divided into the three regions but can be divided into four or more regions. That is, the dot of the diffraction grating is divided by the number corresponding to the number of desired input parallax images.

Figure 6:
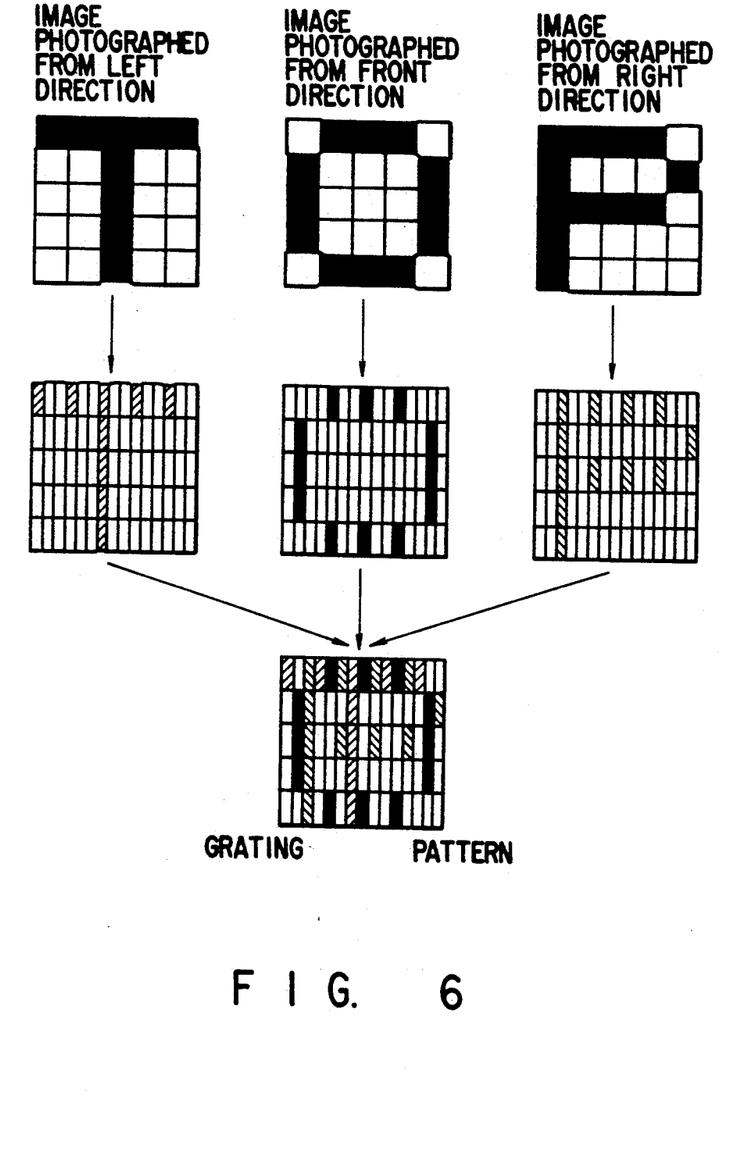
FIG. 6 is a view for explaining a method of manufacturing a display according to the first embodiment of the present invention.

For the sake of descriptive convenience, assume that three parallax images of a given object are photographed. Assume that the object image is observed to be "T" from the left direction, that the object image is observed to be "O" from the front direction, and that the object image is observed to be "P" from the right direction (although such an object does not actually exist). Since the number of parallax images is three, the dot is vertically divided into three regions. As shown in FIG. 6, a diffraction grating pattern of a diffraction pattern image is obtained by drawing a diffraction grating corresponding to the left dot portion representing "T", a diffraction grating corresponding to the central dot portion representing "O", and a diffraction grating corresponding to the right dot portion representing to "P".

Figure 7:
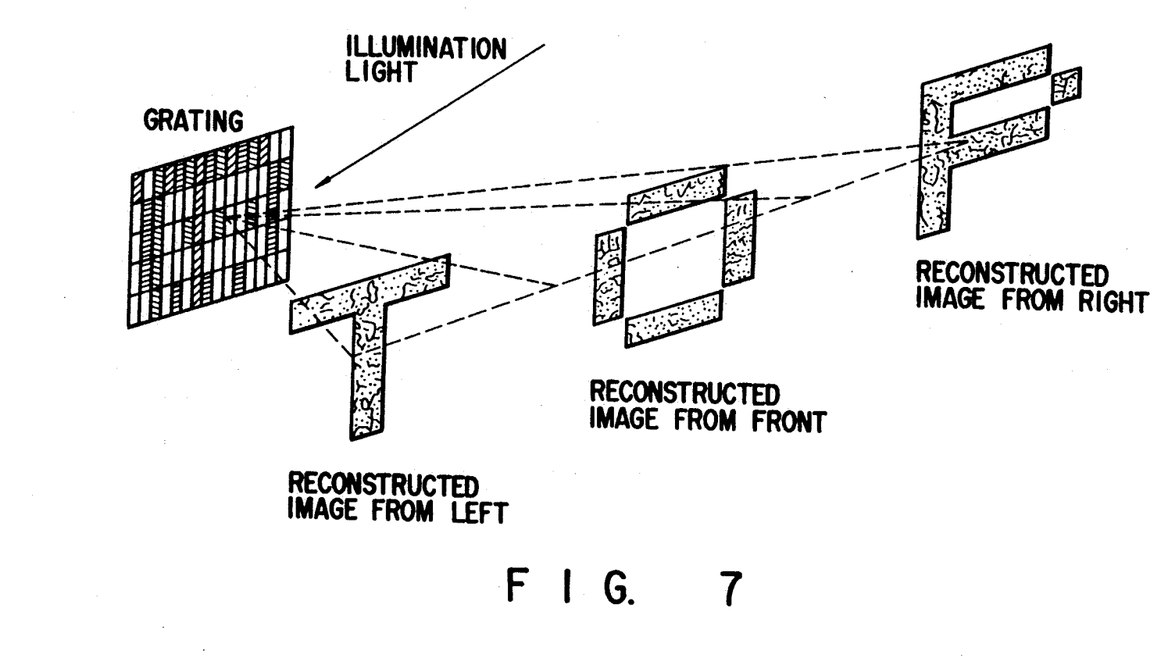
FIG. 7 is a view for explaining a method of observing the display formed in the first embodiment of the present invention.

The diffraction grating image thus obtained is reconstructed, as shown in FIG. 7. "T" can be observed from the left direction, "O" can be observed from the front direction, and "P" can be observed from the right direction. In this case, the number of input images is three. However, four or more parallax images are used to reconstruct different images observed with the right and left eyes of the observer. That is, the observer observes images having parallaxes at the right and left eyes and thus can observe a stereoscopic (three-dimensional) image. When the observation position of the observer is moved in the horizontal direction, a parallax image observed from another direction can be obtained. Therefore, a natural stereoscopic image can be obtained.

Drawing of a diffraction grating by an electron beam exposure apparatus will be described with reference to FIGS. 8 and 9.

Figure 8:
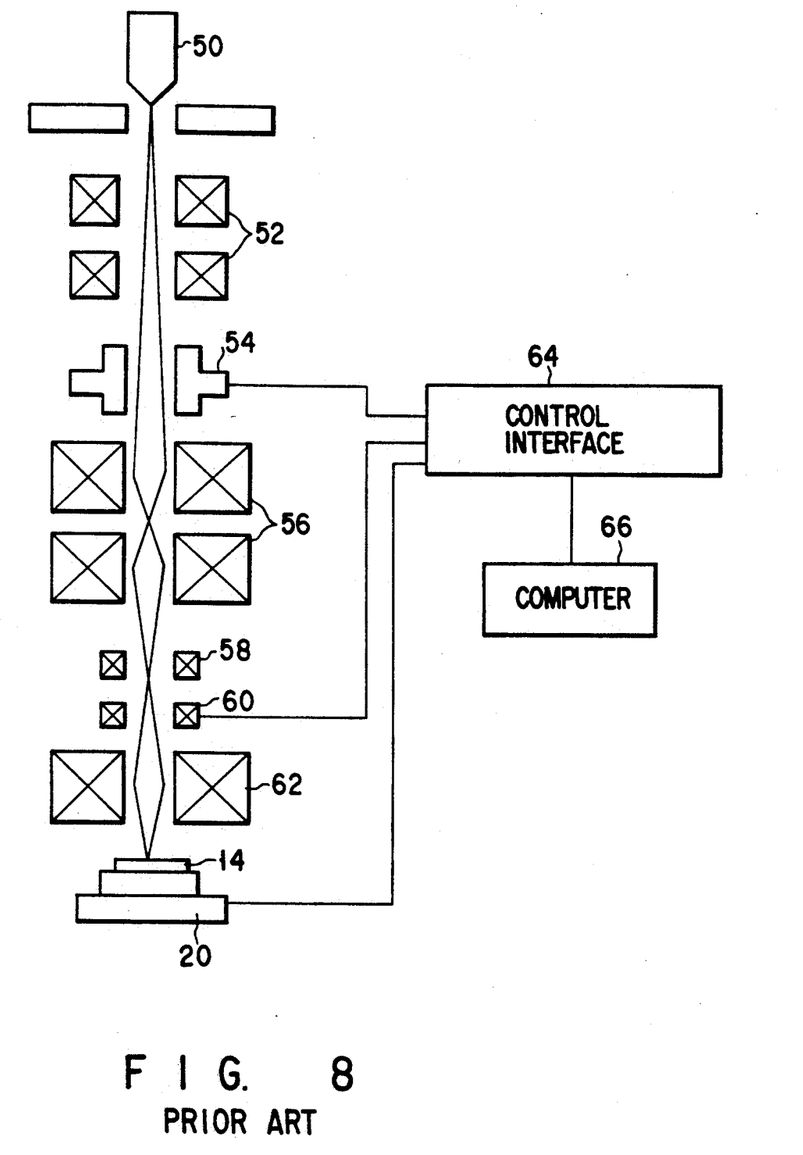
FIG. 8 is a schematic view of an electron beam exposure apparatus used in the manufacture of the display having a diffraction grating pattern according to the first embodiment of the present invention.

As shown in FIG. 8, the electron beam exposure apparatus comprises an electron gun 50, alignment elements 52, a blanker 54, condenser lenses 56, a stigmeter 58, a deflector 60, an objective lens 62, and an X-Y stage 20. A dry plate 14 coated with an EB resist is placed on the X-Y stage 2. The blanker 54, the deflector 60, and the X-Y stage 20 are connected to a computer 66 through a control interface 64. An electron beam emitted from the electron gun 50 is controlled by the computer 66 and scans the dry plate 14.

Figure 9:
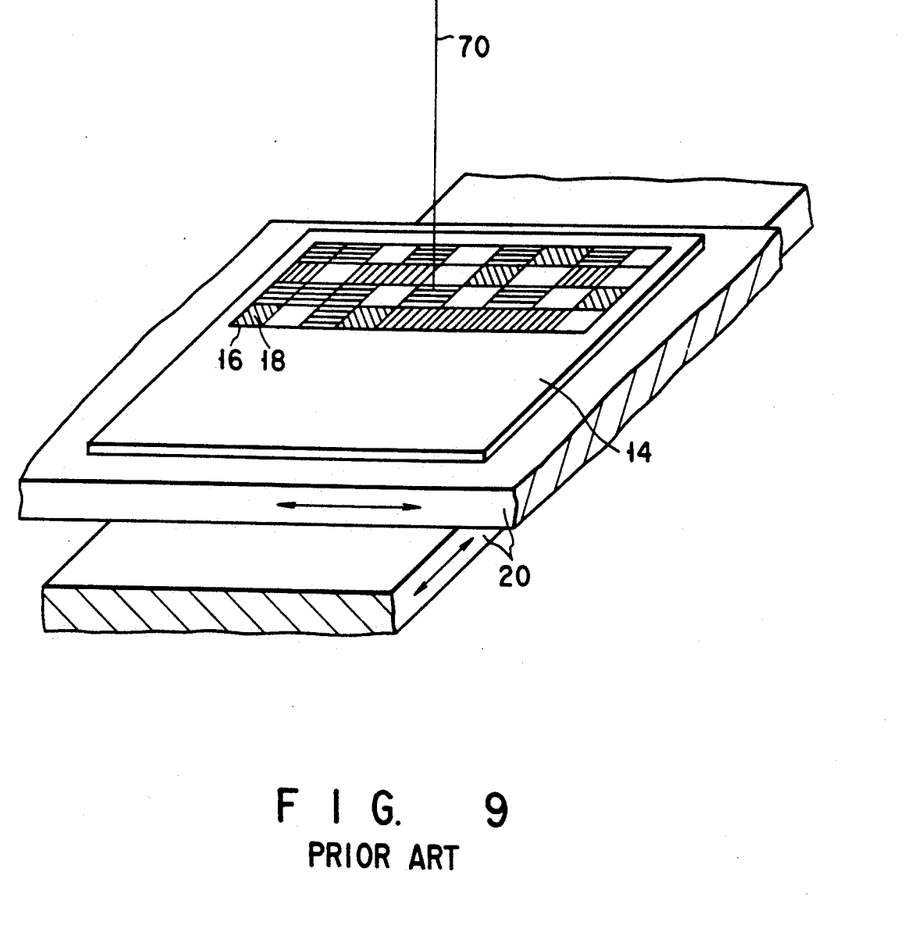
FIG. 9 is a view showing an EB resist dry plate placed on an X-Y stage.

FIG. 9 shows the dry plate 14 placed on the X-Y stage 20. An electron beam 70 emitted from the electron gun 50 draws a diffraction grating pattern 18 in units of dots 16. When the X-Y stage 20 is moved, the diffraction grating patterns 18 are sequentially drawn in the dots 18, respectively.

Figure 10:
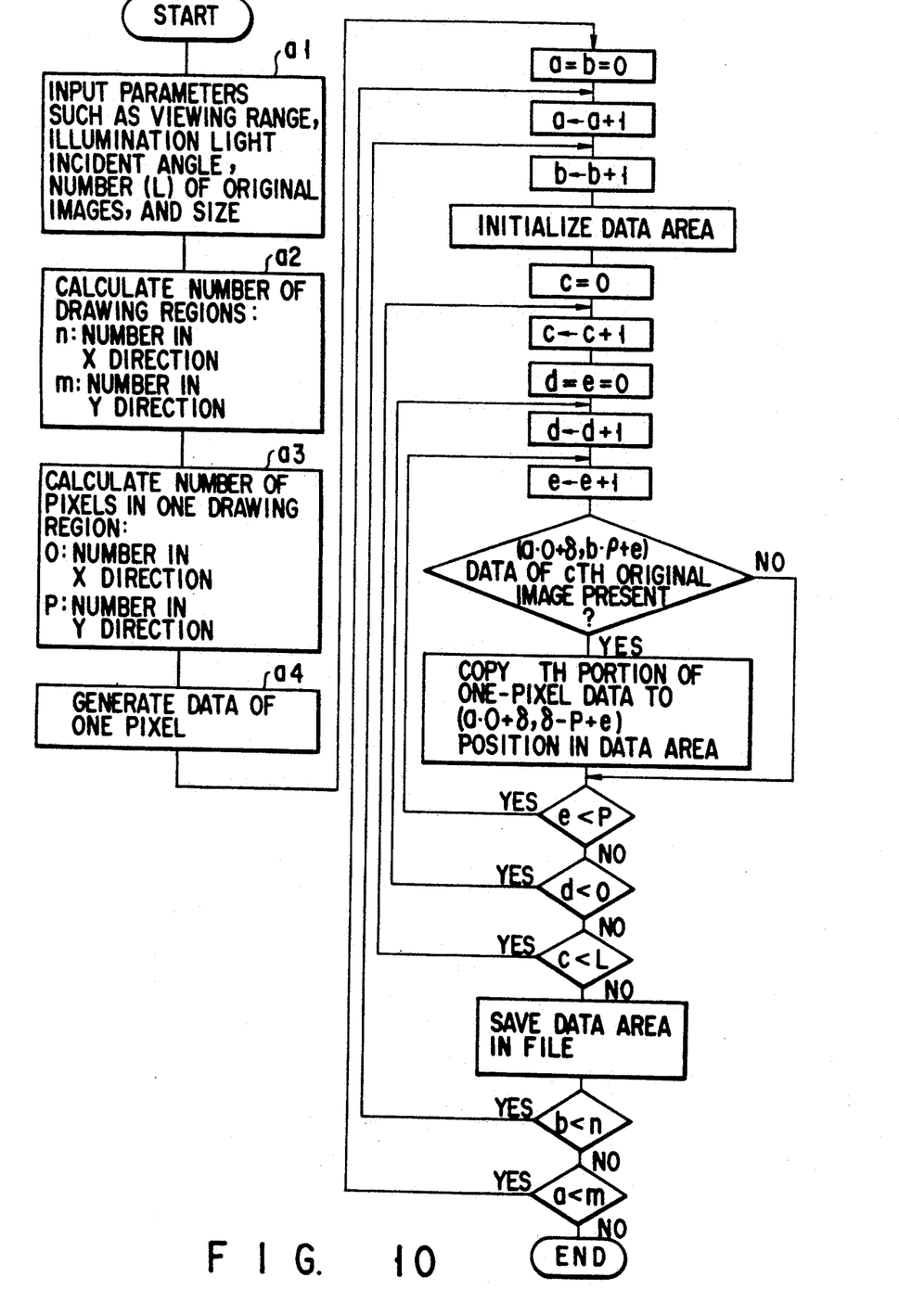
FIG. 10 is a flow chart for explaining a method of manufacturing the display according to the first embodiment of the present invention.

An operation for forming a diffraction grating pattern for actually displaying a three-dimensional image from a plurality of original images having parallaxes with reference to FIG. 10.

In step a1, various parameters for drawing a diffraction grating pattern are input. In steps a2 and a3, calculations are performed to obtain other parameters on the basis of the input parameters. The number of original images is defined as L, the number of drawing areas in the X direction is defined as n, the number of drawing areas in the Y direction is defined as m, the number of dots within one drawing area in the X direction is defined as O, and the number of dots within one drawing area in the Y direction is defined as P. The drawing areas must be assigned to draw a graphic image having a size larger than an electron beam drawing area used for the electron beam exposure apparatus because this electron beam drawing area is a square area having a side of several mm. This electron beam drawing area is called the drawing area.

In step a4, one-dot data is generated. The one-dot data is basically pattern data shown in FIG. 4. This data is vertically divided into portions having the number corresponding to the number of original images, and the divided data are stored.

A diffraction grating pattern is generated for each drawing area. Data corresponding to the drawing area of the original image is checked in units of dots. If data is present in each dot, an original image portion (one of the divided dot portions) of the calculated one-dot data is copied to a position of the corresponding dot within the data area (i.e., an array space representing the diffraction grating patterns). This operation is repeated for all the drawing areas, all the original images, and all dots, thereby obtaining diffraction grating patterns. The obtained diffraction grating patterns are saved in units of drawing areas.

A dry plate having the diffraction grating patterns thus formed is used as an original plate for copy. A well-known emboss method is used to copy the diffraction grating patterns on the original plate In the above diffraction grating patterns, the diffraction grating is constituted by an aggregate of a plurality of curves obtained by translating a curve at arbitrary pitches, so that diffracted light can have a plurality of wavelengths. For this reason, the color of diffracted light observed by the observer can be arbitrarily determined.

For example, wavelengths and their intensities of diffracted light components observed by the observer are respectively defined as $\lambda_1, \lambda_2, \ldots, \lambda_m, \ldots, \lambda_n$, and $A_1, A_2, \ldots, A_m, \ldots, A_n$. At this time, spatial frequencies (reciprocals of the pitches) $f_1, f_2, \ldots, f_m, \ldots, f_n$ required for diffracting light components having the respective wavelengths are defined as follows:

$f_1 = \sin(\theta)/\lambda_1$ $f_2 = \sin(\theta)/\lambda_2$ $f_m = \sin(\theta)/\lambda_m$ $f_n = \sin(\theta)/\lambda_n$ A delta function is defined as $\delta(x)$, a spatial frequency distribution of F(fx) represented by the following equation is given to the diffraction gratings, and a function obtained by transforming F(fx) in accordance with an inverse Fourier transform is defined as f(x), and the curve is translated to have an f(x) distribution in the translation direction:

$$F(fx) = \sum_{m=1}^{n} Am \cdot \delta \cdot (fx - fm)$$

As described above, when the moving direction of the curves constituting the diffracted light components is changed, the colors of the diffracted light components in units of dots are not limited to colors having single wavelengths, but can be arbitrary colors. Therefore, the observer can observe a stereoscopic image more naturally.

The second embodiment of the present invention will be described with reference to FIGS. 11 to 16.

Figure 11:
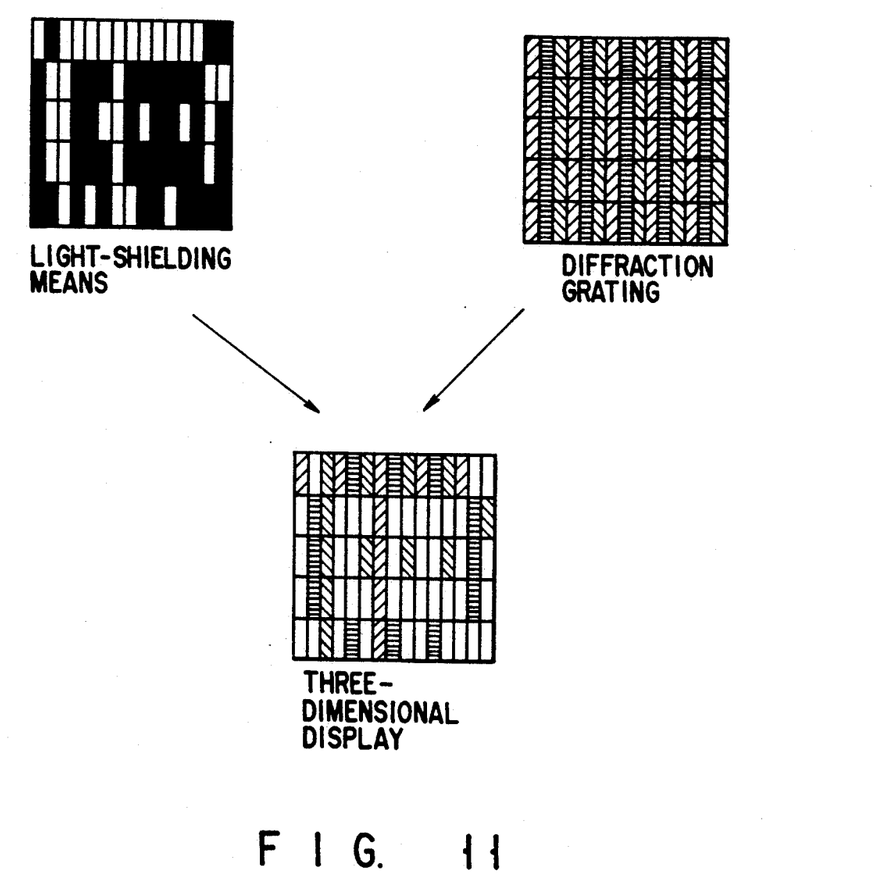
FIG. 11 is a view for explaining a method of manufacturing a display according to the second embodiment of the present invention.

In this embodiment, as shown in FIG. 4, one basic dot of the diffraction grating image is constituted by an aggregate of a plurality of curves obtained by translating a curve, and a light-shielding means having a shape shown in FIG. 11 is arranged in front of or behind the diffraction grating constituting this dot. The illumination or diffracted light is shielded by this light-shielding means. A portion irradiated with the illumination light and a portion not irradiated with the illumination light are formed on the display. Alternatively, a portion through which the diffracted light is transmitted and a portion through which the diffracted light is not transmitted are formed on the display.

A detailed arrangement of the display having diffraction grating patterns according to this embodiment will be described below.

Figure 12:
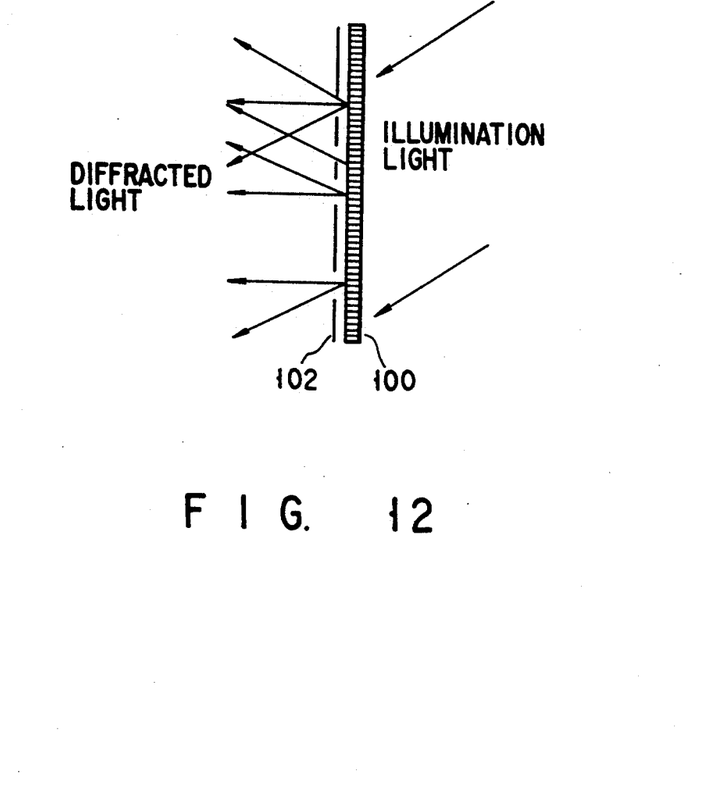
FIG. 12 is a schematic view showing an arrangement of the display according to the second embodiment of the present invention.
Figure 13:
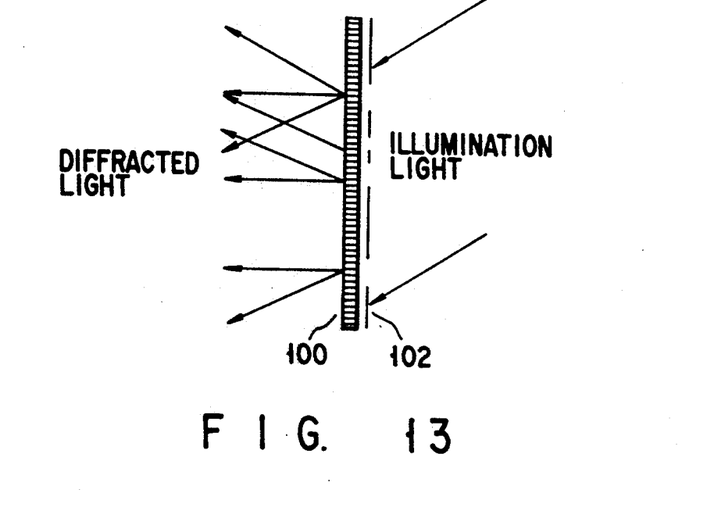
FIG. 13 is a schematic view showing another arrangement of the display according to the second embodiment of the present invention.
Figure 14:
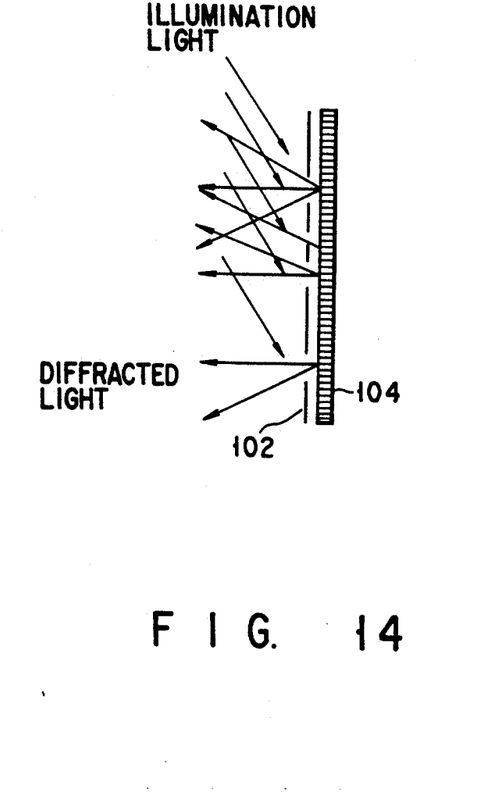
FIG. 14 is a schematic view showing sill another arrangement of the display according to the second embodiment of the present invention.

Light shielded by the light-shielding means may be illumination or diffracted light. More specifically, as shown in FIG. 12, a light-shielding means 102 is arranged on the diffracted light emerging side of a transparent diffraction grating 100. Alternatively, a light-shielding means 102 is arranged on the illumination light incident side of the transparent diffraction grating 100, as shown in FIG. 13, or a light-shielding means 102 is arranged on the diffracted light emerging side, i.e., the illumination light incident side of a reflection diffraction grating 104.

Figure 15:
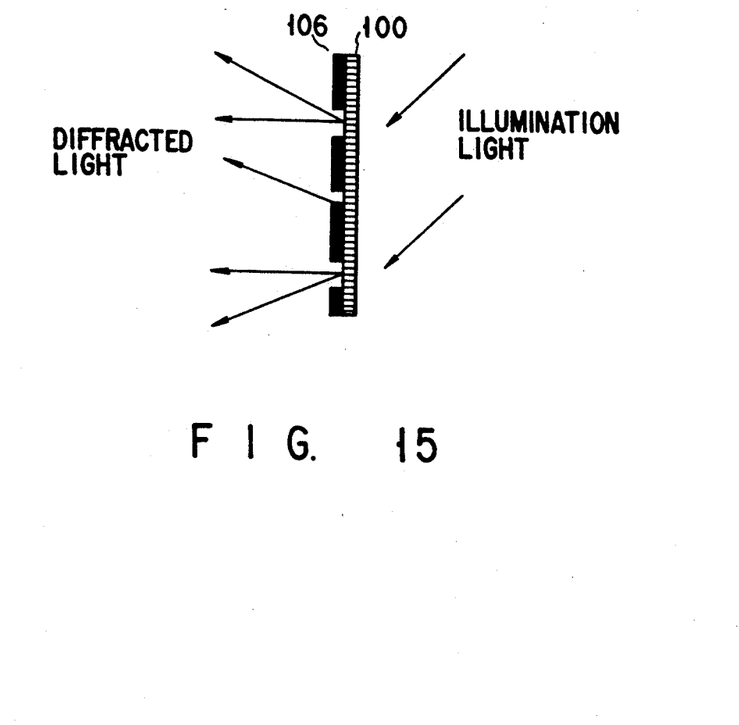
FIG. 15 is a schematic view showing a detailed arrangement of the display according to the second embodiment of the present invention.

In this case, as shown in FIG. 15, the light-shielding means can be printed using a printing ink 106 on the diffraction grating to provide a light-shielding effect, thereby further simplifying the manufacturing process and hence obtaining a three-dimensional image. Alternatively, graphic images may overlap each other by printing, so that an effect for overlapping a stereoscopic image and a flat image by printing can be obtained.

Figure 16:
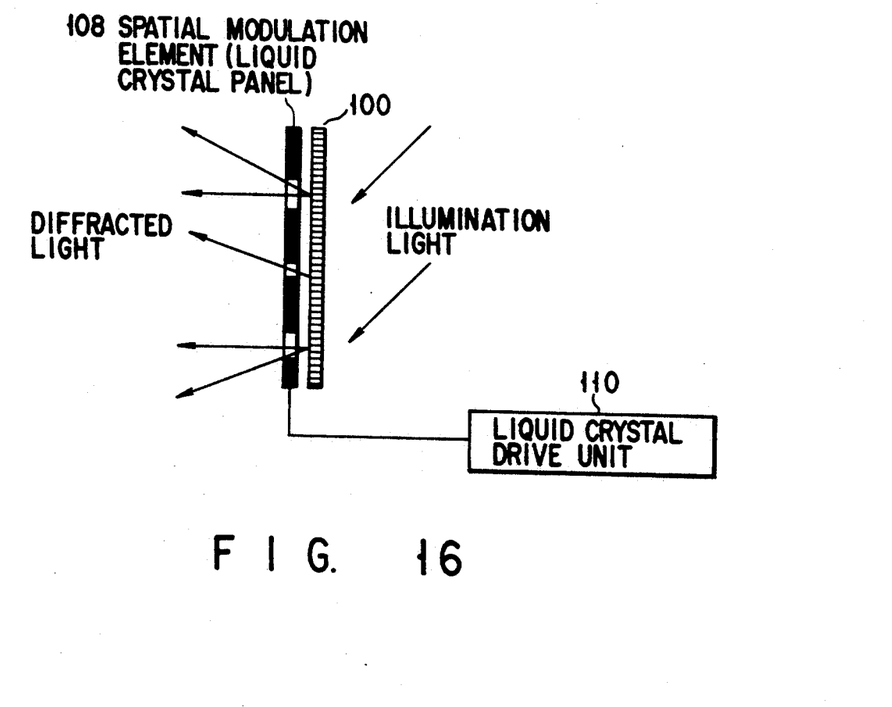
FIG. 16 is a schematic view showing another detailed arrangement of the display according to the second embodiment of the present invention.

As shown in FIG. 16, the light-shielding means may be constituted by a spatial modulation element (e.g., a liquid crystal display panel) 108, so that the shape of the spatial modulation element 108 can be changed by a liquid crystal drive unit 110 within a short period of time, thereby obtaining a three-dimensional dynamic image.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A display having a diffraction grating pattern, comprising:
   (a) a flat substrate;
   (b) at least one dot formed on a surface of said flat substrate, the dot being formed by a diffraction grating pattern as an aggregate of a plurality of curves obtained by translating a curve; and
   (c) light-shielding means having a predetermined shape and arranged on an illumination light incident side of the diffraction gratings.

2. A display according to claim 1, wherein said light-shielding means is obtained using a printing ink.

3. A display according to claim 1, wherein said light-shielding means is obtained using a spatial modulation element.

4. A display having a diffraction grating pattern, comprising:
   (a) a flat substrate;
   (b) at least one dot formed on a surface of said flat substrate, the dot being formed by a diffraction grating pattern as an aggregate of a plurality of curves obtained by translating a curve; and
   (c) light-shielding means having a predetermined pattern and arranged on a diffracted light emerging side of the diffraction gratings.

5. A display according to claim 4, wherein said light-shielding means is obtained using a printing ink.

6. A display according to claim 4, wherein said light-shielding means is obtained using a spatial modulation element.

7. A display having a diffraction grating pattern, comprising:
   (a) a flat substrate; and
   (b) at least one dot formed on a surface of said substrate, the dot being formed by a diffraction grating pattern as an aggregate of a plurality of curves obtained by translating a curve;
   wherein said curve has a gradient $\Omega$ (omega) which changes from $\Omega_1$ to $\Omega_2$ at the extreme left and right portions of the dot and having a pitch d wherein the curve is translated to obtain the plurality of curves with the following conditions satisfied:

$$\tan((\text{omega})_1) = \sin((\text{alpha})_1)/\sin((\text{theta}))$$

$$\tan((\text{omega})_2) = \sin((\text{alpha})_2)/\sin((\text{theta}))$$

$$d = (\text{lambda})/\sin((\text{theta}))$$

where (theta) is an incident angle of illumination light, $(\text{alpha})_1$ and $(\text{alpha})_2$ are angles (directs of first-order diffracted light) from which the diffraction grating is observed, and (lambda) is a wavelength of the first-order diffracted light.

8. A display according to claim 7, wherein the dot has a region in which no diffraction grating is present.

9. A display according to claim 7, wherein the dot has a region in which no diffraction grating is present, and the region in which no diffraction grating is present is divided by a line parallel to a translation direction of the curve of the diffraction grating.

10. A display having a diffraction grating pattern, comprising:
    (a) a flat substrate; and
    (b) at least one dot formed on a surface of said substrate, the dot being formed by a diffraction grating pattern as an aggregate of a plurality of curves obtained by translating a curve;
    wherein the dot is constituted by an aggregate of a plurality of curves obtained by translating a curve at arbitrary pitches,
    if wavelengths of diffracted light components are defined as $(\text{lambda})_1, (\text{lambda})_2, \ldots, (\text{lambda})_m, \ldots, (\text{lambda})_n$, and intensities of the light components at respective wavelengths are defined as $A_1, A_2, \ldots, A_m, \ldots, A_n$, spatial frequencies (reciprocals of the pitches) of the diffraction gratings required to diffract the light components having the respective wavelengths are defined as follows:

$$f_1 = \sin(\text{theta})/(\text{lambda})_1$$

$$f_2 = \sin(\text{theta})/(\text{lambda})_2$$

$$f_m = \sin(\text{theta})/(\text{lambda})_m$$

$$f_n = \sin(\text{theta})/(\text{lambda})_n$$

and
    a delta function is defined as (delta)(X), a spatial frequency distribution of F(fx) represented by the following equation is given to the diffraction gratings, and a function obtained by transforming F(fx) in accordance with an inverse Fourier transform is defined as f(x), and the curve is translated to have an f(x) distribution in a translation direction:

$$F(fx) = \sum_{m=1}^{n} (\text{sigma}) A_m \cdot (\text{delta}) \cdot (fx - fm).$$

11. A display according to claim 10, wherein the dot has a region in which no diffraction grating is present.

12. A display according to claim 10, wherein the dot has a region in which no diffraction grating is present, and the region in which no diffraction grating is present is divided by a line parallel to a translation direction of the curve of the diffraction grating.

* * * * *